April 28, 1953 — T. GASCOIGNE — 2,636,925
ELECTRONIC EGG GRADER
Filed June 6, 1949
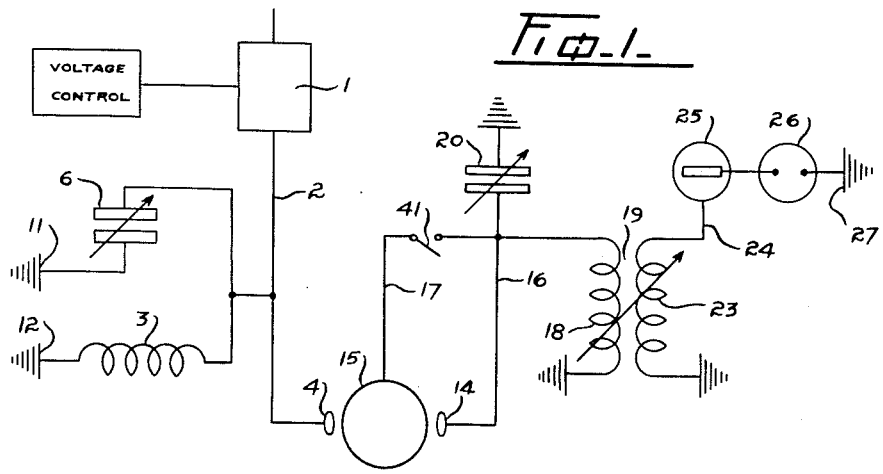
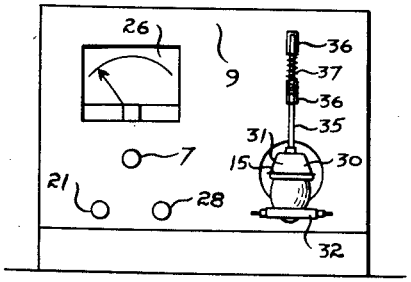
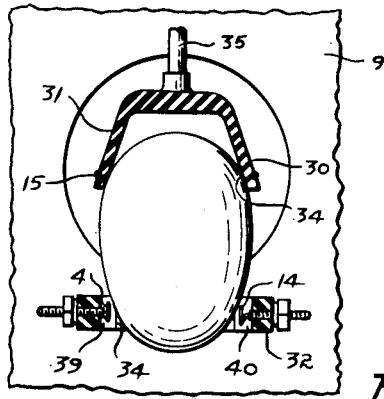
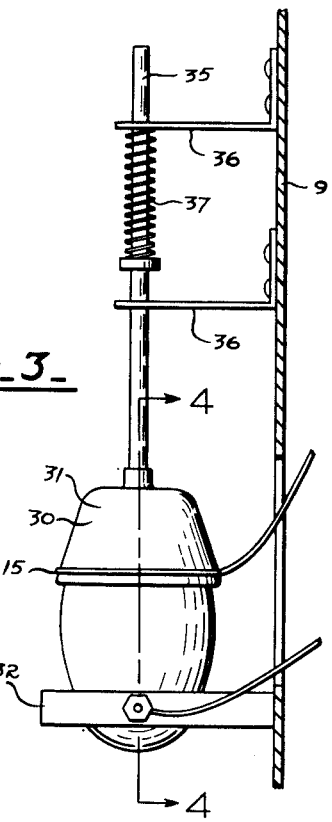
INVENTOR
TOM GASCOIGNE
ATTORNEY Patented Apr. 28, 1953

2,636,925

UNITED STATES PATENT OFFICE 2,636,925

ELECTRONIC EGG GRADER

Tom Gascoigne, Cloverdale, British Columbia, Canada

Application June 6, 1949, Serial No. 97,473

4 Claims. (Cl. 175—183)

My invention relates to improvements in electronic egg graders.

The objects of the invention are to provide means of testing eggs by passing radio frequency through them separately and showing on a microampere or microvolt meter the amount of current of such R. F., whereby to determine the freshness, fertility or hatchability and the condition of an egg generally.

Other electronic devices have been made for egg testing, but hitherto the R. F. output is relatively high and it is impossible to accurately measure the flow through the egg, whereas the present invention is designed to operate with high sensitivity and a very low R. F. input to the egg.

A further object is to maintain the input line voltage within substantially one-half volt, so that all readings will be accurate and fully representative of the condition of the egg tested.

Referring to the drawings:

Figure 1 is a diagrammatic view of the electronic circuit employed in the invention.

Figure 2 is an elevational view of the invention.

Figure 3 is a side elevational view of the egg support.

Figure 4 is a sectional view taken on the line 4—4 of Figure 3.

In the drawings like characters of reference indicate corresponding parts in each figure.

The numeral 1 indicates generally an electronic regulated high frequency R. F. oscillator to which is coupled an automatic voltage control to keep the input operating line voltage substantially within one-half volt plus or minus.

From the oscillator 1 a lead 2 feeds high frequency R. F. to a tuned loading coil 3 and also to an output ring 4 and the loading coil is tuned through a variable condenser 6 having a control knob 7 mounted upon the front panel 9 of the device, see Figure 2. The variable condenser 6 and the loading coil 3 are grounded respectively as at 11 and 12, to the chassis, not shown.

Receiving rings 14 and 15 are connected by leads 16 and 17 to the primary coil 18 of a variable R. F. output transformer 19 and to a variable condenser 20 which is used to tune the primary coil 18 through the medium of a knob 21 on the panel 9 to balance the primary coil 18 with the loading coil 3. The secondary, or pickup coil 23 is connected by a lead 24 to a crystal rectifier 25 and to a terminal on a microampere or microvolt meter 26, which is grounded as at 27. The variable output transformer 19 is adapted to be adjusted by a knob 28 located on the face of the panel 9. The panel 9, the primary coil 18 and secondary coil 23 of the variable transformer 19 and the variable condenser 20 are also grounded as indicated.

Mounted upon the panel 9 is a cradle or egg receiver 30 which consists of an inverted cup 31 and a lower cup or ring 32 which act in conjunction with each other to hold an egg whilst undergoing a test. The cups are both of fibre, or other material of high insulating value and are both provided with a recess or opening 34 in which to receive an end of the egg. In a convenient form of the egg receiver 30 the inverted cup 31 is carried by a vertical stem 35 which is slidably mounted in arms 36 projecting from the panel and is lightly urged in a downward direction by a compression spring 37. The lower cup 32 projects from the panel and is fixedly supported thereby to support an egg to be tested with the ends of the egg in contact with the cups. The output ring 4 is adjustably mounted in a pocket 39 formed in the inner periphery of the lower cup 32. The receiving ring 14 is mounted in a pocket 40, which is diametrically opposed to the pocket 39 and the receiving ring 15 surrounds the rim of the upper cup 31. All of the rings are supported out of contact with the shell of the egg to be tested.

The receiving ring 15 is not essential to the operation of the device, consequently a switch 41 is included in the circuit, so that the path of high frequency may be entirely across the egg if desired. The receiving ring 15 is disposed at a point about the periphery of the upper cup 31, so that when the switch 41 is closed the path will always be through the meat of the egg below the air cell of said egg.

In operation, an egg is placed between the cups 31 and 32 and high frequency passes through the egg from the output ring 4 to the receiving rings 14 and 15, or to the ring 14 only, the upper cup being spring loaded ensures the disposition of the egg in proper proximity to the rings 4, 14 and 15. The high frequency received by the rings 14, 15 is carried through to the primary of the R. F. output transformer 19 and the secondary coil 23 of said transformer carries it to the crystal rectifier 25 and to the meter 26. For greatest efficiency, the R. F. output is kept at its extreme minimum, condensers 6 and 20 are used to obtain maximum meter reading with the lowest possible output to output ring 4.

Once the output transformer 19 has been adjusted to synchronize with the loading coil 3, it need not again be touched, unless local conditions of humidity or otherwise warrant.

The meter gives good variability on individual eggs placed in the cradle 30 and efficiently grades them for quality and hatchability internally and for general over-all condition.

It will be noticed that the egg does not make physical contact with the rings 4, 14 and 15 as the R. F. must break down the dielectrics between 4 and 14, 4 and 15, or all of them, to operate.

What I claim as my invention is:

1. In an electronic egg tester having an egg receiver and R. F. output and R. F. receiving leads connected to the egg receiver, said egg receiver comprising opposed cup-like receptacles of insulating material, each of said receptacles having an annular rim, means permitting one of said receptacles being movable relative to the other to permit the placing of an egg therebetween and in contact with the rim of each receptacle, a pair of R. F. annular carrying members mounted within the insulating material parallel to the rim and spaced from the interior surface of the cup-like elements, said R. F. carrying members being connected to the R. F. output and receiving leads.

2. In an electronic egg tester having an egg receiver and R. F. output and R. F. receiving leads connected to the egg receiver, said egg receiver comprising opposed cup-like receptacles of insulating material, each of said receptacles having an annular rim, means permitting one of said receptacles being movable relative to the other to grip an egg therebetween, a pair of R. F. carrying members mounted within the insulating material and spaced from the interior surface of the cuplike elements, each of said R. F. carrying members being a single annular ring and being connected to the R. F. output and receiving leads, one of said R. F. carrying rings being mounted within one of the cup-like elements.

3. An electronic egg tester comprising a regulated variable R. F. oscillator, a two part egg receiver and a meter, said two parts being spaced apart to embrace an egg between them, an outlet lead from the oscillator having a single annular high frequency R. F. output member located in one of said parts and supported adjacent the surface of an egg placed in the egg receiver, a R. F. receiving lead to the meter having a single R. F. receiving member located in the other part of the egg receiver and supported adjacent the surface of an egg placed in the egg receiver, said member being remote from the output member, a loading coil coupled to the output lead, means for varying the R. F. carried by the output member, a variable transformer and a crystal rectifier in series with the receiving member and the meter, and means for tuning the R. F. carried to the transformer.

4. An electronic egg tester comprising a variable R. F. oscillator, a two part egg receiver and a meter, said two parts being spaced apart to embrace an egg between them, an output lead from the oscillator having an R. F. output member disposed within one of the receiver parts and adjacent the surface of an egg in said egg receiver part, an R. F. receiver lead to the meter having an R. F. receiving member located within the other part of the egg receiver and adjacent the surface of the egg within the parts, a loading coil coupled to the output lead, means for varying the R. F. carried to the output member, a variable transformer and a crystal rectifier in series with the receiving member and the meter, and a variable condenser connected with the R. F. receiving lead between the receiving member and the primary of the variable transformer, said R. F. output member and said R. F. receiving member being parallel to each other and being relatively movable to assume a substantially exact predetermined spacing from the surface of any egg being placed in the egg receiver.

TOM GASCOIGNE.

References Cited in the file of this patent

UNITED STATES PATENTS

| Number | Name | Date |
|---|---|---|
| 2,071,607 | Bjorndal | Feb. 23, 1937 |
| 2,076,944 | Howe | Apr. 13, 1937 |
| 2,082,364 | Store | June 1, 1937 |
| 2,149,686 | Rivenburgh | Mar. 7, 1939 |
| 2,285,152 | Firestone | June 2, 1942 |
| 2,362,774 | Romanoff | Nov. 14, 1944 |
| 2,373,846 | Olken | Apr. 17, 1945 |